United States Patent
Kleemeier et al.

(10) Patent No.: US 6,614,638 B1
(45) Date of Patent: Sep. 2, 2003

(54) PROTECTIVE DEVICE AGAINST FAULT CURRENTS FOR PROTECTION AGAINST FIRE

(75) Inventors: Manfred Kleemeier, Neutraubling (DE); Reinhard Solleder, Lappersdorf (DE); Reinhard Schmid, Regensburg (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 10/048,951

(22) PCT Filed: Jul. 18, 2000

(86) PCT No.: PCT/DE00/02333
§ 371 (c)(1),
(2), (4) Date: Feb. 5, 2002

(87) PCT Pub. No.: WO01/11746
PCT Pub. Date: Feb. 15, 2001

(30) Foreign Application Priority Data

Aug. 5, 1999 (DE) .......................... 199 37 064

(51) Int. Cl.⁷ .............................................. H02H 9/02
(52) U.S. Cl. ................................................ 361/93.1
(58) Field of Search .................. 361/93, 56, 93.1, 361/42, 45

(56) References Cited

FOREIGN PATENT DOCUMENTS

| DE | 29 24 122 | 12/1980 | | |
|----|-----------|---------|---|---|
| DE | 196 34 438 A1 | * 8/1996 | ............ | H02H/3/16 |
| DE | 196 34 438 A1 | 3/1998 | | |
| DE | 297 05 187 U1 | 9/1998 | | |
| EP | 0 810 707 A2 | * 12/1991 | ............ | H02H/3/33 |
| EP | 0 464 516 A2 | 1/1992 | | |

OTHER PUBLICATIONS

"Warum Fehlerstrom–Schutzchalter mit netzspannungsunabhangiger Auslosung?", Solleder, *Electrotechnische Zeitschrift–Etz.*, vol. 107, Nr. 20, 10/86.

* cited by examiner

*Primary Examiner*—Brian Sircus
*Assistant Examiner*—Z Kitov
(74) *Attorney, Agent, or Firm*—Harness, Dickey & Pierce, P.L.C.

(57) ABSTRACT

A protective device against fault currents includes a triggering arrangement for performing at least the functions of detecting a fault current and/or triggering power-down of the network to be protected. The triggering arrangement, outside the most strict quartic curve (A), corresponds to the protection of persons in case of indirect contact, and below the triggering quartic curve (B), corresponds to protection against fire. The triggering quartic curve (B) satisfies the relationship: $I_{Limit}(f)/I_{An}=F(f)=B=\text{const.}$, wherein $I_{Limit}(f)= W_{Fire}/U_{Network}$. In the relationships, $I_{Limit}(f)$ represents the limit fault current permissible for the corresponding frequency, where there is still no risk of fire; $I_{An}$ represents the nominal triggering fault current at the frequency of the network taking into consideration the protection of persons; $W_{Fire}$ represents the power limit in watt required for protection against fire; $U_{Network}$ represents the network voltage to be protected and $F(f)$ represents what is called the frequency factor.

8 Claims, 1 Drawing Sheet

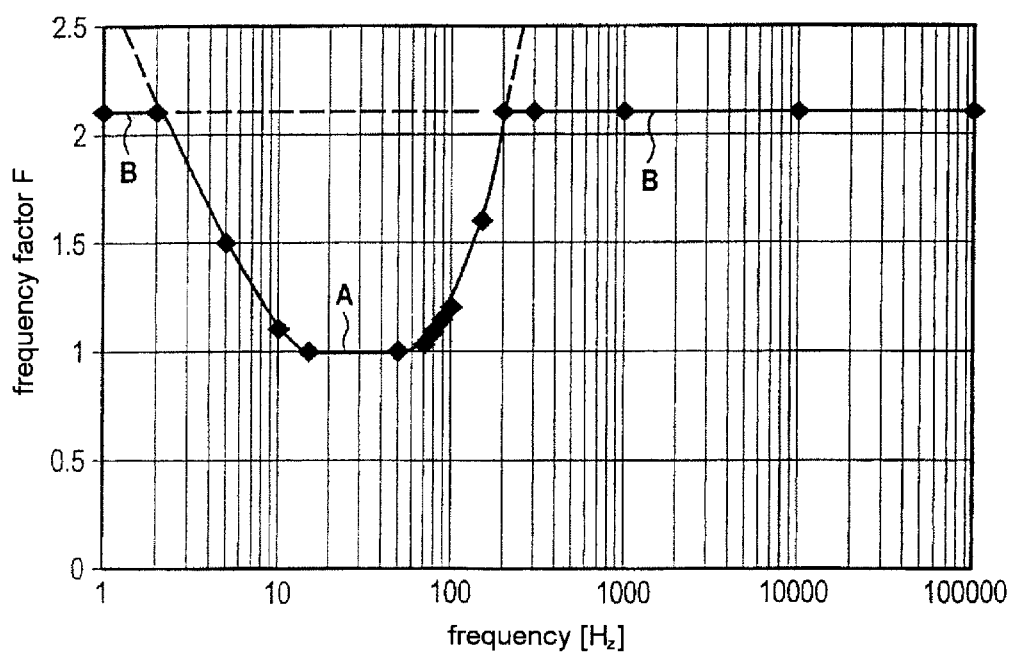

PROTECTIVE DEVICE AGAINST FAULT CURRENTS FOR PROTECTION AGAINST FIRE

This application is the national phase under 35 U.S.C. §371 of PCT International Application No. PCT/DE00/02333 which has an International filing date of Jul. 18, 2000, which designated the United States of America, the entire contents of which are hereby incorporated by reference.

FIELD OF THE INVENTION

The invention generally relates to a fault-current protective device, which operates with a tripping (triggering) circuit. Preferably, it includes the functions of "detection of a fault current" and "tripping in order to disconnect a network that is to be protected".

Devices for protection against fault currents can be designed on the basis of various types of functional principles: they may be designed to be independent of the network voltage, and are then generally referred to as fault-circuit breakers. Alternatively, they may require energy from the network for tripping, when they are dependent on the network voltage. These are generally referred to as differential-current circuit breakers. The expression fault-current protective device is in this case intended to cover both types of devices for protection against fault currents, jointly.

BACKGROUND OF THE INVENTION

The design of known general fault-current protective devices is generally known, for example, from "etz" (1986), Issue 20, pages 938 to 945. FIGS. 1 to 3 there show outline circuit diagrams and functional principles of an FI circuit breaker which is independent of the network voltage, and of a DI circuit breaker which is dependent on the network voltage.

Fault-current protective devices are intended to ensure protection against direct contact with a live conductor and to assure such protection against indirect contact, protection against touching a conductive component on which a voltage with respect to ground has built up owing to a fault.

Fault-current protective devices of both types generally operate using a core balance transformer, which is used to form the residue of the currents in conductors which are passed through it and are to be protected. In the event of a fault current, a voltage signal is induced in a secondary winding, and this voltage signal is evaluated. Thereafter, via a tripping relay and via a switching mechanism, it leads to the opening of switching contacts in the power supply to be protected. The tripping relay of a fault-current protective device is in this case inductively coupled, via the core balance transformer, to the network to be monitored. In the case of a differential-current protective device, network energy is also conductively coupled into a circuit having an amplifying effect.

The tripping response of fault-current protective devices is dependent, inter alia, on the frequency of the fault current (DE-A-196 34 438). The relationships in this case are known, as to where protection is provided against ventricular fibrillation and with regard to the areas in which it is still possible to let go of a live conductor if it is touched directly.

SUMMARY OF THE INVENTION

An embodiment of the invention is generally based on an object of developing a fault-current protective device which ensures protection against indirect contact as well as fire protection.

Such an object can be achieved by a fault-current protective device. The tripping circuit can be matched to keep the tripping fault current below a tripping limit curve (B) for fire protection, especially for fault current frequencies, in the tripping circuit, beyond a stricter limit curve (A) for protecting personnel against indirect contact. An embodiment of the invention is based on a combination of the requirements for personnel protection and for fire protection relating to a suitable fault-current protective device. This interaction is preferably governed by the relationship:

$$\frac{I_{limit}(f)}{I_{\Delta n}} = F(f) = B = const.,$$

where $$I_{limit}(f) = \frac{W_{fire}}{U_{network}},$$

where $I_{limit}(f)$ is the maximum fault current limit, at which there is still no risk of fire, for the respective frequency, $I_{\Delta n}$ is the rated tripping fault current at the network frequency, in order to take account of personnel protection, $W_{fire}$ is the power limit, in watts, required for fire protection, $U_{network}$ is the network voltage of the network to be protected, and F(f) Is a so-called frequency factor.

In this case, the tripping characteristic of fault-current protective devices can be defined for indirect contact and as function of frequency.

Such a fault-current protective device takes account of the increasing number of appliances which produce fault currents at a relative high frequency in the event of a fault. Such appliances can include, for example frequency changers and appliances with pulsed power supplies.

With regard to indirect contact, personnel protection can be based on the idea of defining a rated fault current for a maximum permissible ground resistance at a network frequency. This, thus ensures a maximum permissible contact voltage with respect to ground, in a manner known per se, for protection against indirect contact in the event of a fault. Thus, for example, the maximum permissible contact voltage with respect to ground at a network frequency of 50 to 60 Hz is normally defined to be 50 V. Accordingly, a maximum ground resistance $R_{ground}$ in accordance with the relationship $$R_{ground} = \frac{U_{max}}{I_{\Delta n}},$$

where $U_{max}$ is the maximum voltage involved which is not going to be dangerous for indirect contact, and $I_{\Delta n}$ is once again the rated tripping fault current at the network frequency, in accordance with limit curve A, for protecting personnel against indirect contact.

Other known requirements for personnel protection can also be taken into account in the limit curve A, instead of this relationship.

BRIEF DESCRIPTION OF THE DRAWINGS

The invention will now be explained in an exemplary format with reference to the specification and to a diagram, which is shown in the drawing, wherein:

In the drawing, the frequency of fault currents which can occur in the tripping circuit are shown on the abscissa. A frequency factor F is plotted on the ordinate.

DETAILED DESCRIPTION OF THE PREFERRED EMBODIMENTS

In the drawing, a frequency factor F is shown, plotted on the ordinate. This frequency factor is the quotient of the maximum permissible current at a variable frequency divided by the maximum permissible current at 50 or 60 Hz. In the exemplary embodiment, the curve A shows the function F(f) as a limit curve for protection against indirect contact. Safety thus exists for values which are on the limit curve A, or are below this limit curve, in the diagram.

The limit curve B, a straight line, takes account of fire protection for values which are on this limit curve, or which are below this limit curve. The invention, in this embodiment, is based on the knowledge that an electrical power of more than 150 W is required to ignite a fire. Event stricter fire protection can be based on a power limit of 100 W, or even of 60 W. The maximum permissible fault current is given by $$I_{limit}(f) = \frac{W_{fire}}{U_{network}},$$

For example, if $W_{fire}$ is 150 W, this accordingly results in a maximum permissible current, independently of the frequency, of $$\frac{150 \text{ W}}{230 \text{ V}} = 0.652 \text{ A or } 652 \text{ mA}.$$

If the rated fault current is chosen to be 300 mA, this results in the following expression for a network frequency in the order of 50 or 60 Hz:

$$\frac{652 \text{ mA}}{300 \text{ mA}} - 2.173 \text{ for the } F \text{ Factor or } F(f).$$

In the exemplary embodiment, the curve A is based on a maximum contact voltage $U_{max}$ of 50 V, and a rated fault current $I_{\Delta n}$ of 300 mA, resulting in a ground resistance $R_{ground}$ of:

50 V/300 mA=166.7Ω

A further requirement is that $$\frac{I(f)}{I_{network\ frequency}} = A,$$

where

I(f) is the maximum permissible body current at frequencies other than the network frequency, and $I_{network\ frequency}$ is the maximum permissible body current at the network frequency, in each case for indirect contact.

The F factor can be taken from curve A in the drawing, or else can be determined of appropriate tables, including those for other requirements.

The exemplary embodiment is based on a rated tripping fault current of 300 mA at the network frequency. The rated tripping fault current is generally chosen as appropriate for the circumstances. For example, swimming baths and bathrooms may demand a rated fault current of 30, or of 10 mA.

The described fault-current protective device can also be configured as a monitoring appliance, or as a so-called "residual monitoring device".

Thus, a protective device against fault currents includes a triggering arrangement for performing at least the functions of detecting a fault current and/or triggering power-down of the network to be protected. The triggering arrangement, outside the most strict quartic curve (A), corresponds to the protection of persons in case of indirect contact, and below the triggering quartic curve (B), corresponds to protection against fire. The triggering quartic curve (B) satisfies the relationship: $I_{Limit}(f)/I_{\Delta n}=F(f)=B=$const., where $I_{Limit}(f)=W_{Fire}/U_{Network}$. In the relationships, $I_{Limit}(f)$ represents the limit fault current permissible for the corresponding frequency, where there is still no risk of fire; $I_{\Delta n}$ represents the nominal triggering fault current at the frequency of the network taking into consideration the protection of persons; $W_{Fire}$ represents the power limit in watt required for protection against fire; $U_{Network}$ represents the network voltage to be protected and F(f) represents what is called the frequency factor.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A fault-current protective device, comprising:
    a tripping circuit for fault current detection and for tripping in order to disconnect a network that is to be protected, wherein the tripping circuit is matched to keep a tripping fault current below a tripping limit curve (B) for fire protection and beyond a relatively stricter limit curve (A) for protecting against indirect contact, with the tripping limit curve (B) satisfying the following relationship:

$$\frac{I_{limit}(f)}{I_{\Delta n}} = F(f) = B = \text{const.},$$

where $$I_{limit}(f) = \frac{W_{fire}}{U_{network}},$$

where $I_{limit}(f)$ is a maximum fault current limit wherein there is still no risk of fire for the respective frequency, $I_{\Delta n}$ is a rated tripping fault current at the network frequency, $W_{fire}$ is a power limit, in watts, for fire protection, $U_{network}$ is the network voltage of the network to be protected, and F(f) is a frequency factor.

2. The fault-current protective device as claimed in claim 1, wherein a ground resistance ($R_{ground}$) is not exceeded in the network to be protected, in accordance with the relationship:

$$R_{ground} = \frac{U_{max}}{I_{\Delta n}},$$

where $U_{max}$ is a maximum voltage involved which is not going to be dangerous for indirect contact, and $I_{\Delta n}$ is the rated tripping fault current at the network frequency, in accordance with limit curve A, for protecting against indirect contact, and where the maximum permissible current I(f)), flowing via a body at indirect contact at other frequencies is not exceeded, in accordance with the relationship $$\frac{I(f)}{I_{network\ frequency}} = F(f) = A,$$

where $I_{network\ frequency}$ is the maximum body current at the network frequency.

3. An appliance, comprising the fault-current protection device of claim 1.

4. The appliance of claim 3, further comprising a pulsed power supply.

5. A frequency changer, comprising the fault-current protection device of claim 1.

6. An appliance, comprising the fault-current protection device of claim 2.

7. The appliance of claim 6, further comprising a pulsed power supply.

8. A frequency changer, comprising the fault-current protection device of claim 2.

* * * * *